US009172596B2

(12) United States Patent
Palazzolo

(10) Patent No.: US 9,172,596 B2
(45) Date of Patent: Oct. 27, 2015

(54) CROSS-NETWORK LISTENING AGENT FOR NETWORK ENTITY MONITORING

(71) Applicant: Patrice Palazzolo, Nice (FR)

(72) Inventor: Patrice Palazzolo, Nice (FR)

(73) Assignee: SAP SE, Walldorf (DE)

( * ) Notice: Subject to any disclaimer, the term of this patent is extended or adjusted under 35 U.S.C. 154(b) by 327 days.

(21) Appl. No.: 13/721,464

(22) Filed: Dec. 20, 2012

(65) Prior Publication Data

US 2014/0181291 A1  Jun. 26, 2014

(51) Int. Cl.
*H04L 12/26* (2006.01)
*H04L 12/24* (2006.01)
*H04L 29/06* (2006.01)

(52) U.S. Cl.
CPC .............. *H04L 41/04* (2013.01); *H04L 41/046* (2013.01); *H04L 41/0213* (2013.01); *H04L 41/0273* (2013.01); *H04L 41/0627* (2013.01); *H04L 41/0663* (2013.01); *H04L 41/0681* (2013.01); *H04L 41/0695* (2013.01); *H04L 41/082* (2013.01); *H04L 41/20* (2013.01); *H04L 41/5009* (2013.01); *H04L 43/0811* (2013.01); *H04L 43/0817* (2013.01); *H04L 63/029* (2013.01)

(58) Field of Classification Search
USPC .......................................... 709/224
See application file for complete search history.

(56) References Cited

U.S. PATENT DOCUMENTS 6,894,972 B1 * 5/2005 Phaal ............................ 370/229
2011/0010441 A1 * 1/2011 Gutierrez ...................... 709/223

* cited by examiner

*Primary Examiner* — Tu Nguyen
(74) *Attorney, Agent, or Firm* — Schwegman Lundberg & Woessner, P.A.

(57) ABSTRACT

Various embodiments herein include at least one of systems, methods, and software of a cross-network listening agent for network entity monitoring. In some such embodiments, the cross-network listening agent is an element of software or a hardware device connected to a network and listens for metric data broadcast by other entities of the network. The cross-network listening agent receives the broadcast metric data and transmits the metric data to a network and system management system resident on another network. The network entities are generally any device that reports status with regard to metrics the network entity monitors with regard to its own state. In some embodiments, the network entities report their status in Simple Network Management Protocol (SNMP) messages that are broadcast on the network, but are unable to reach the network and system management system resident on the other network.

14 Claims, 4 Drawing Sheets

CROSS-NETWORK LISTENING AGENT FOR NETWORK ENTITY MONITORING

BACKGROUND INFORMATION

In today's networked computing environment, a single organization may have many networks on which many network entities, such as networked devices and systems, are connected. While many network entity monitoring tools exist, such tools need to be installed on each network to receive and monitor messages from devices on each respective network. As a result, each of many the many networks need to be monitored separately.

DETAILED DESCRIPTION

Figure 1:
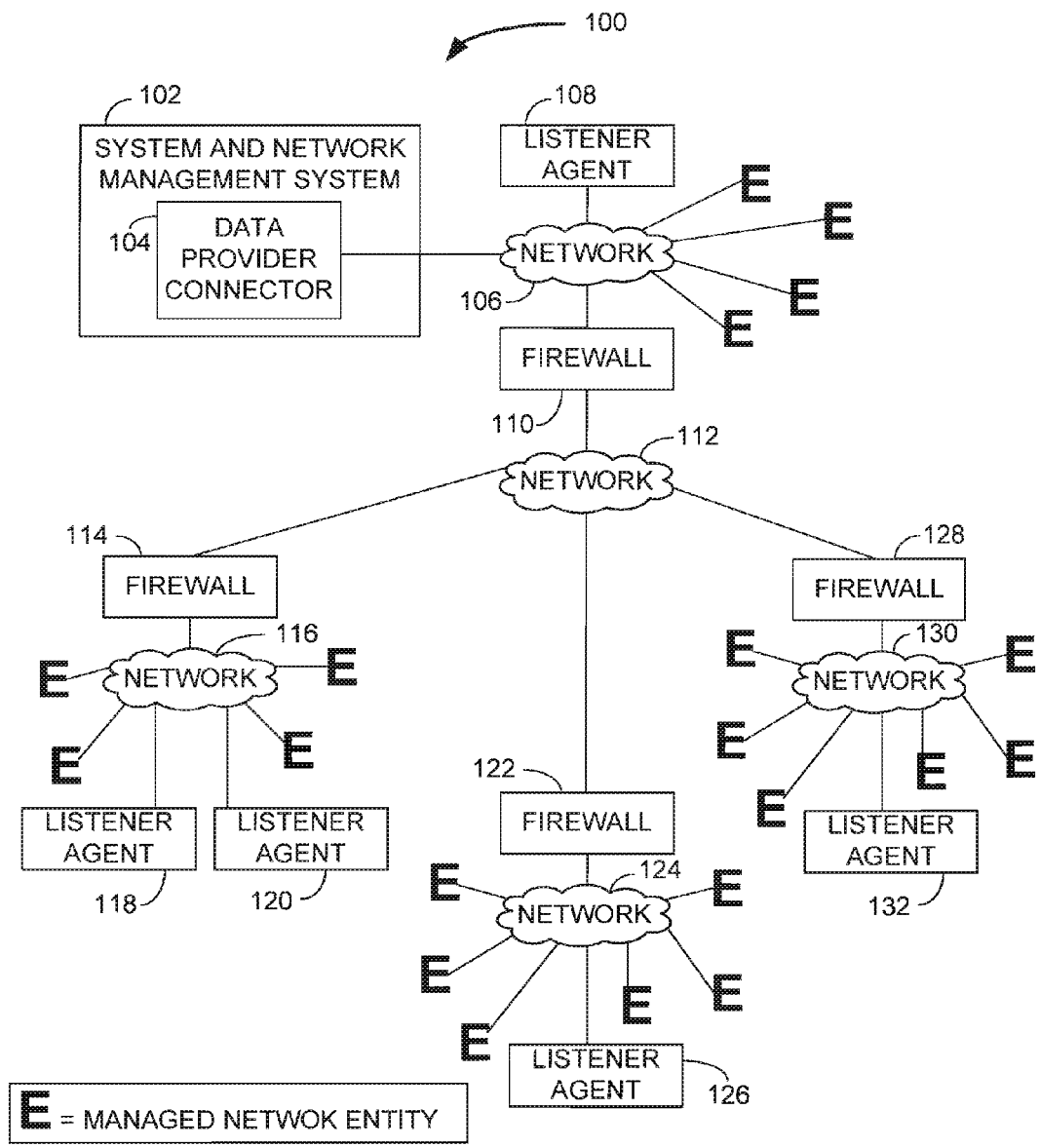
FIG. 1 is a logical illustration of a networked computing environment including a plurality of networks, according to an example embodiment.

Various embodiments herein include at least one of systems, methods, and software of a cross-network listening agent for network entity monitoring. In some such embodiments, the cross-network listening agent is an element of software that executes on computing device connected to a network and listens for metric data broadcast by other entities of the network. The cross-network listening agent receives the broadcast metric data and transmits the metric data to a network and system management system resident on another network. The network entities are generally any device that reports status with regard to metrics the network entity monitors with regard to its own state. In some embodiments, the network entities report their status in Simple Network Management Protocol (SNMP) messages that are broadcast on the network. Such a message broadcast by a network entity may, for example, be a network switch that monitors its network connection ports for operability, connection speed, and the like. Another network entity may be a printer that monitors its paper and toner levels. A further network entity may be a software system that monitors database latency times, connectivity with other network entities, an amount of storage space available to the software system, and other metrics. Through such embodiments, as are described in detail with reference to the drawings, monitoring of network entities on a plurality of networks may be performed via a single network and system management system.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical illustration of a networked computing environment 100 including a plurality of networks, according to an example embodiment. The network computing environment 100, as illustrated, includes a plurality of networks 106, 112, 116, 124, 130. One of the networks is a network 112 that interconnects the other networks 106, 116, 124, 130. The network 112 that interconnects the other networks 106, 116, 124, 130 may be a wide area network, such as the Internet. Each of the networks includes 106, 116, 124, 130 includes at least one listener agent 108, 118, 120, 126, 132 connected thereto. In addition, each of the networks 106, 116, 124, 130 are generally separated from one another, such as by a firewall 110, 114, 122, 128. Further, each network 106, 116, 124, 130 includes a number of network entities represented in FIG. 1 as a large bold "E".

As previously briefly discussed, the network entities are generally networked devices, processes, programs, or other hardware or software elements that monitor their own state in view of metrics and broadcast messages reporting their current state. Such messages may be broadcast by the network entities upon occurrence of an event such as a fault, upon violation of a rule such as a configured service level agreement, on a scheduled basis, or for other reasons. These messages may be SNMP messages or other messages according to a standard or a proprietary definition. Regardless of the encoding of the messages, the messages are broadcast by the network entities on the network 106, 116, 124, 130 of the broadcasting network entity. When broadcast, the one or more listener agents 108, 118, 120, 126, 132 on the network 106, 116, 124, 130 on which the message is broadcast receives and processes the message.

The network 106 also includes a network and system management system 102. The network and system management system 102 is a system that consumes messages broadcast by network entities on the network 106 to which it is connected, stores data representative of the messages, provides management tools for administrators to track and handle network and network entity conditions reported in and discovered from network entity messages, and the like. Examples of the network and system management system 102 include Solution Manager available from SAP AG of Waldorf, Germany; Network Management Center available from Hewlett-Packard Company of Palo Alto, Calif.; Tivoli available from IBM Corporation of Armonk, N.Y.

The network and system management system 102, in some embodiments, may be augmented with a data provider connector 104. The data provider connector, in some embodiments that include one, operates to facilitate communication with the listener agents 108, 118, 120, 126, 132 deployed across the various networks 106, 116, 124, 130. Functions performed by the data provider connector 104 may include communicating configuration information to the various listener agents 108, 118, 120, 126, 132 and receiving data from the listener agents 108, 118, 120, 126, 132. In some embodiments, the data provider connector 104 may determine configuration information for the listener agents 108, 118, 120, 126, 132 based on configuration settings stored or updated within the network and system management system 102. Such configuration settings may be with regard to types of messages the network and system management system 102 wants to receive (messages of interest) from the listener agents 108, 118, 120, 126, 132 upon receipt from the network entities. In some embodiments, the configuration settings may identify one or more message types that are not of interest and are not to be communicated to the network and system management system 102. Examples of messages of interest may be with regard to a network switch or software process losing connectivity or otherwise failing, while a message not of interest may be with regard to a printer being out of paper. Further configuration settings may be with regard to how often the listener agents are to transmit messages, network and communication configurations, and other settings, depending on the particular embodiment. However, as stated above, the network and system management system 102 may be augmented with a data provider connector 104. In some embodiments that don't include a data provider connector 104, some or all of the same functionality may be natively within the network and system management system 102 or other functionality may be configured to be utilized in a suitable manner to achieve such tasks.

As illustrated in FIG. 1, the network 124 includes the listener agent 126 connected thereto. The listener agent 126 in such embodiments listens on the network 124 for messages, such as SNMP messages, broadcast by the various network entities also connected to the network 124. The messages broadcast by the network entities typically will not be allowed past the firewall 122 and onto the network 112. As a result, the messages will not reach the network and system management system 102. Thus, the messages are received by the listener agent 126, processed, which may include filtering out messages that are not of interest to the network and system management system, and transmitted to the network and system management system 102. The processing of the messages by the listener agent 126, which will be describe further with regard to FIG. 2 and FIG. 3, may vary between embodiments. However, the processing generally includes any filtering as already discussed, any needed data translations, and generating of a reporting message that will cross the firewall 122, traverse the network 112, cross the firewall 110 onto the network 106, and be delivered to the network and system management system 102. Such a reporting message may be a message generated and transmitted according to the Simple Object Access Protocol (SOAP) or other message capable of being transmitted to reach the network and system management system 102. Other example messages and delivery modes may include an application programming interface (API) call, a file stored to a designated network storage location accessible by a process of the system and network management protocol, a data structure transmitted via a value added network, or other message and message transmission scheme.

The listener agents 108, 118, 120, 126, 132 as typically deployed, will listen and report all network entity message types to the network and system management system 102. However, the listener agents 108, 118, 120, 126, 132 are configurable to ignore certain message types. Further, in some embodiments, multiple listener agents 108, 118, 120, 126, 132 may be deployed to a single network 106, 116, 124, 130. For example, network 116 includes two listener agents 118, 120. These two listener agents 118, 120 may be deployed in tandem for various purposes. For example, a plurality of listener agents may be deployed to a single network to provide a failover, such that when a first listener agent fails, a second listener agent will either lose communication with the first listener agent and take over or receive a message from the network and system management system 102 instructing it to take over. In another embodiment, a first listener agent may be configured to listen for messages of certain types or from certain network entities and a second listener agent may be configured listen for messages of other message types or from other network entities. Such embodiments provide for load balancing, such as when a network on which the plurality of listener agents are deployed include many network entities that broadcast many messages. In yet further embodiments, one listener agent may be configured to forward data of received messages to the network and system management system 102 and another listener agent may be configured to forward data of the same or certain other network entity messages to another network management system 102 or even another system type or location altogether. In these plural listener agent embodiments, although only two listener agents have been illustrated and described, more than two listener agents may be included in different embodiments. Thus, there is great flexibility in deploying and configuring the network listener agents, such as the network listener agents 118, 120 deployed on the network 116.

Figure 2:
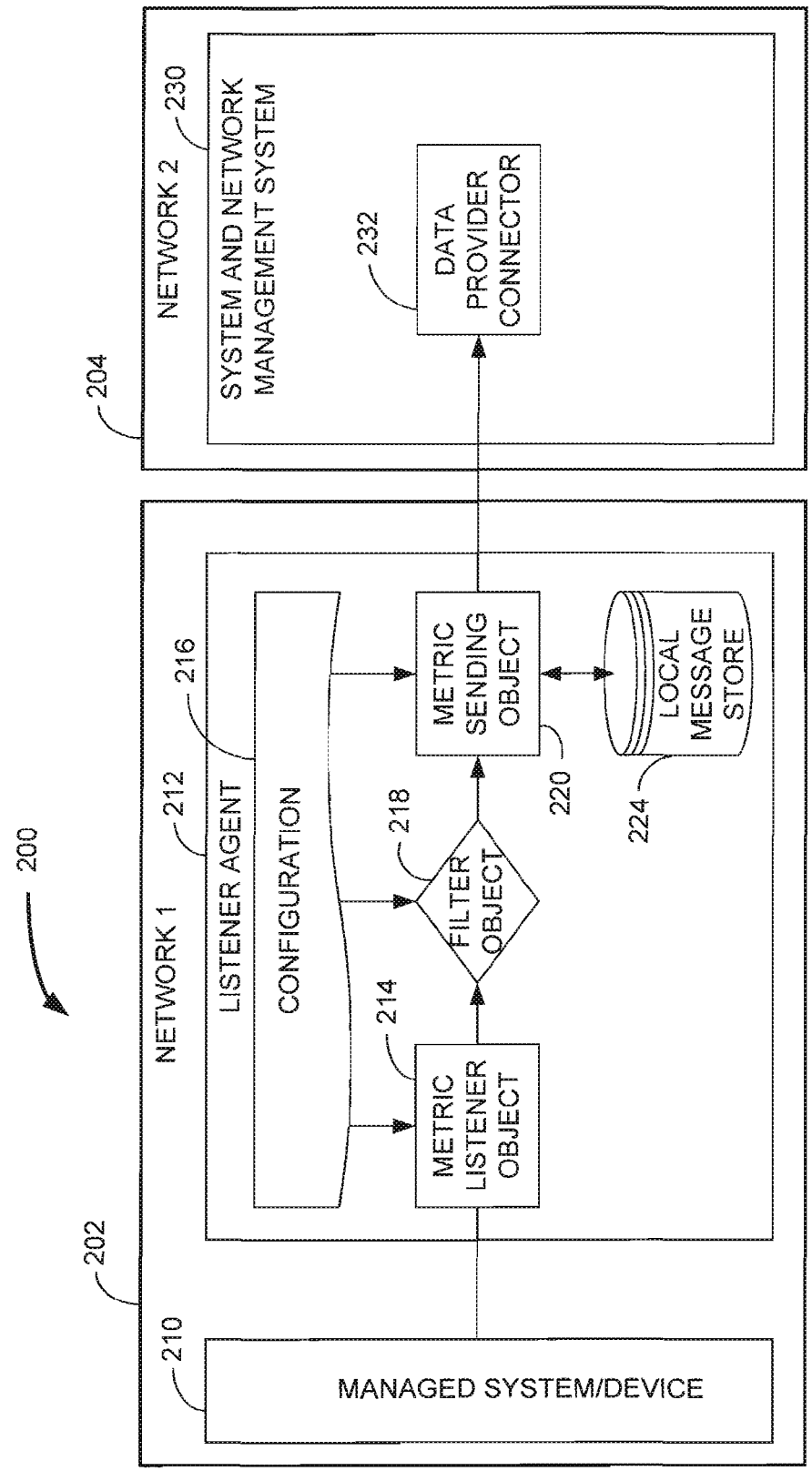
FIG. 2 is a logical block diagram of a first network monitored by a system and network monitoring system on a second network, according to an example embodiment.

FIG. 2 is a logical block diagram of a first network 202 monitored by a system and network management system 230 on a second network 204, according to an example embodiment. The first network 202 is typically separated from the second network 204 by at least one firewall, and may be further separated by one or more other networks, such as the Internet.

The first network 202 includes at least one network entity 210, such as a managed system or device, connected thereto. The network entity 210 monitors is operation according to metrics, which when met, cause the network entity 210 to broadcast a message, such as an SNMP message, on the first network 202. The message will include at least an identifier of the network entity and data representing the metric violated. Other data may be included in the message, such as an error code, an identifier of a network entity component, a date and time stamp of when an event or condition triggering the message occurred, and other such data.

The first network 202 additionally includes a listener agent 212. The listener agent 212 may be a standalone software program in some embodiments. In other embodiments, the listener agent 212 may be a module that can be added on to another program or added to a network device that will execute the listener agent 212. In yet another embodiment, the listener agent 212 is a hardware device including at least one network interface device, at least one processor, and at least one memory device that stores instructions executable by the at least one processor to cause the hardware device to perform the functions of the listener agent.

Regardless of the hardware or software form of the listener agent 212, the listener agent 212 includes various components therein. The components generally include configuration data 216 that configures other components therein. The other components may include a metric listener object 214, a filter object 218, a metric sending object 220, and a local message store 224. The metric listener object 214 operates to receive a message broadcast over the first network 202 by the network entity 210 upon an event occurrence, such as a metric violation. Such a message is often referred to as an SNMP trap. The metric listener object 214 may then process the received message, which may include formatting data of the message according to a particular protocol or other format for further processing by other components of the listener agent 212. Operation of the metric listener object 214 may be according to configuration data held in the stored configuration data 216, such as data instructing the metric listener object 214 to execute upon receipt of the message, the format in which to translate the received message, and the like.

The metric listener object 214 may then forward the formatted data to a filter object 218. The filter object 218 determines whether the received message is or includes a message of interest to the network and system management system 230 according to data stored in the configuration data 216. When the message is not of interest, the message may be ignored, discarded, and no further action is taken by the listener agent 212 with regard to the message. When the message is or includes a message of interest, the filter object passes the formatted data to the metric sending object 220.

The metric sending object 220, upon receipt of the formatted data, may first store a copy of the formatted data to a local message store 224. The local message store 224 may be a data storage location of a memory, a data storage device such as a disk or flash memory, or other data storage device. The metric sending object 220 then, depending on a configuration as represented in the stored configuration data 216, may cache the formatted data until a later time when the formatted data is to be aggregated with other received formatted data prior to sending or may immediately send the formatted data. Regardless, when it is time to send the formatted data to the network and system management system 230, the data is processed to put the formatted data in a proper form for transmission from the first network 202 to the second network 204 and to be consumed by the network and system management system 230, which may include a data provider connector 232, as described with regard to the data provider connector 104 of FIG. 1.

The processing of the formatted data by the metric sending object 220 may include generation of a SOAP message. Such a SOAP message may then be transmitted to the network and system management system 230 via a web service call of the network and system management system 230. The web service called, in some embodiments, is a web service provided to the network and system management system 230 through augmentation with the data provider connector 232. In some embodiments, once the data is communicated successfully to the network and system management system 230, the metric sending object 220 may delete the formatted data stored to the local message store 224 if a copy was stored thereto.

Figure 3:
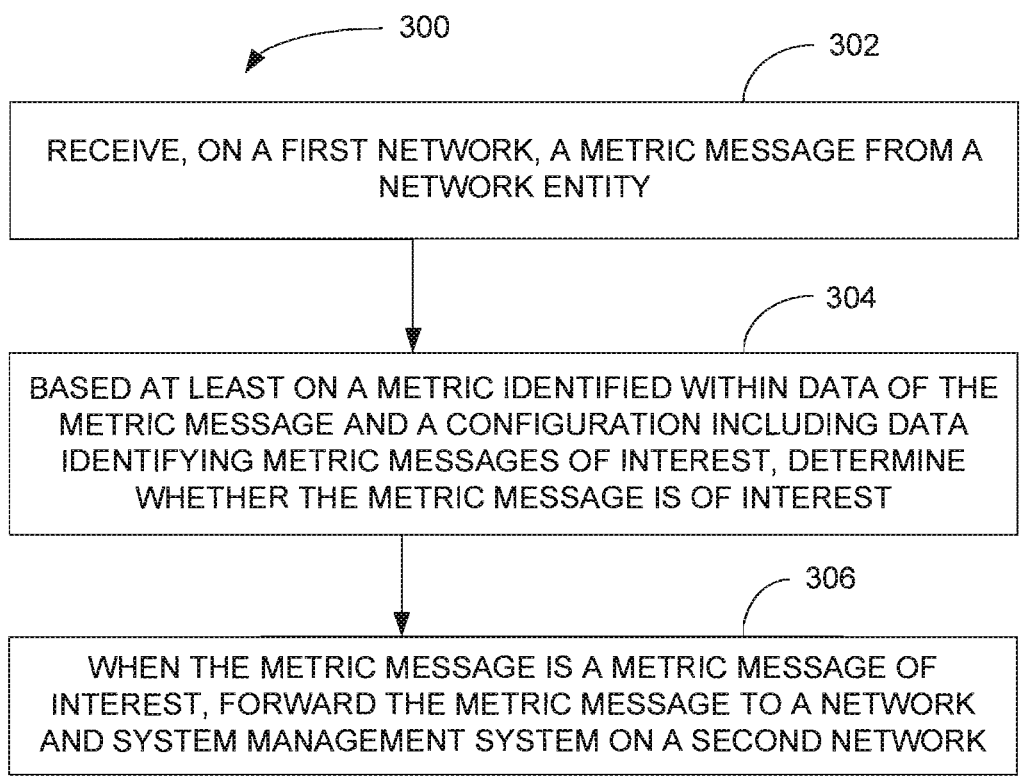
FIG. 3 is a block flow diagram of a method, according to an example embodiment.

FIG. 3 is a block flow diagram of a method 300, according to an example embodiment. The method 300 is an example of a method that may be performed in whole or in part by a listener agent, for one or more of the example listener agents 108, 118, 120, 126, 132 of FIG. 1 and listener agent 212 of FIG. 2, to communicate metric messages broadcast by network entities on one network to a network and system management system on another network.

In some embodiments, the method 300 includes receiving 302, on a first network, a metric message from a network entity. Based at least on a metric identified within data of the metric message and a configuration including data identifying metric messages of interest, the method 300 then determines 304 whether the metric message is of interest. When the metric message is not of interest, the metric message may be discarded. However, when the metric message is a metric message of interest, the method 300 includes forwarding 306 the metric message to a network and system management system on a second network.

The metric message, in some embodiments of the method 300, includes data identifying the network entity that sent the metric message and data representative of a monitored state of the network entity. For example, the metric message may include data identifying a particular software process or component thereof or a network device on which an error event has occurred that violated a rule monitored in the software process or component or on the network device. As stated previously, the metric message may be an SNMP message, but in some embodiments, the metric message may take another form as set by an industry standard or that is proprietary in nature as defined by a particular software or device maker.

In some embodiments of the method 300, the configuration data identifying metric messages of interest identifies at least one type of metric message of interest that is to be forwarded 306 to the network and system management system. For example, the configuration data may identify metric messages including data representative of a priority or criticality rating, a particular type of fault or error, or having originated from a particular network entity or network entity type as being messages of interest. Further, the method 300 may include caching a representation of received messages and the configuration data may include rules with regard to received metric messages received in close time proximity. Such rules with regard to metric messages of a certain type may be ignored for a period according to a rule, such as metric messages indicating a loss of connectivity by a particular network entity or entity type to another network entity, network entity type, or network resource (i.e., the Internet, database). The general idea with such rules is to accommodate for self-healing situations in a networked environment and varying network latency issues that may occur during times of extreme usage. Through such rules, false or self-resolvable issues will not receive unneeded attention. A rule, in such embodiments, may cause the relevant metric messages to be ignored until a certain number of the messages has reached a threshold, the messages have been received for a continuous period greater than a threshold, or some other threshold depending on the particular metric violation and the particular embodiment.

In further embodiments, prior to forwarding 306 the metric message to the network and system management system, some embodiments of the method 300 include storing a copy of the metric message in local data storage. Then, after successfully forwarding 306 the metric message to the network and system management system, the method 300 may delete the copy of the metric message from the local data storage. Such embodiments may ensure a metric message is communicated to the network and system management system is in fact delivered even if communication with the network and system management system is lost for a period. Upon reestablishing communication with the network and system management system, the method 300 in such embodiments, will then forward 300 the metric message or metric messages that were not previously successfully forwarded and then delete them from the local data storage.

In other embodiments, prior to forwarding 306 the metric message to the network and system management system, the method 300 may cache metric messages for a period, which may be in accord with a configuration setting, and forward all metric messages received during the period in a single communication. For example, some such embodiments include storing the received metric message in local storage. Then according to a schedule of when metric messages are to be forwarded 306, the method 300 includes retrieving metric messages stored in the local storage and aggregating the retrieved metric messages to form a metric message payload. The metric message payload may then be forwarded 306 to the network and system management system. The aggregating of the retrieved messages in some embodiments includes generating a SOAP message and forwarding 306 the message includes transmitting the generated SOAP message utilizing a web service of or otherwise associated with the network and system management system. Finally, after successfully forwarding 306 the metric message payload to the network and system management system, some such embodiments include deleting each metric message aggregated into the metric message payload. However, in other embodiments, the local storage in which the metric messages are cached operates as a log. In such embodiments, the data of the metric messages aggregated and successfully forwarded 306 is updated to indicate the respective metric messages have been sent to the network and system management system.

Figure 4:
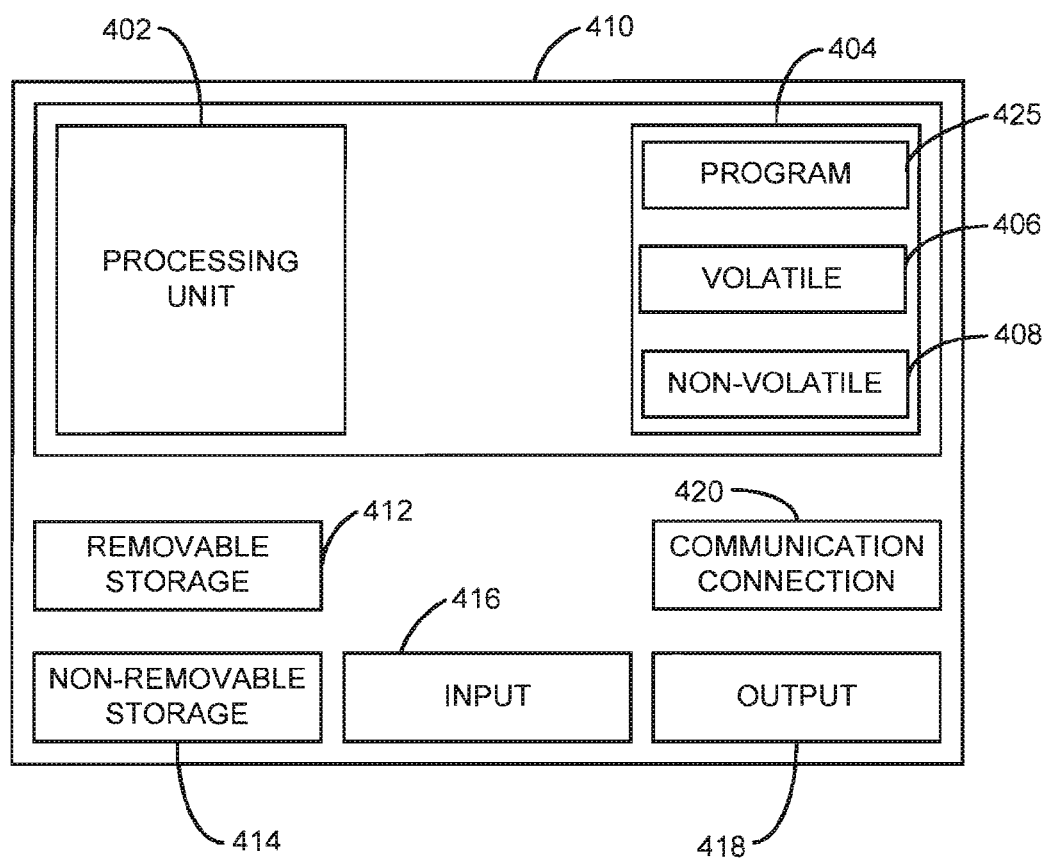
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a non-transitory computer-readable medium. For example, a computer program 425 capable of performing one or more of the methods illustrated herein may be stored on a non-transitory computer readable medium, such as a program of a listener agent 108, 118, 120, 126, 132 of FIGS. 1 and 212 of FIG. 2.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, on a first network, a metric message from a network entity;
   based at least on a metric identified within data of the metric message and a configuration including data identifying metric messages of interest, determining whether the metric message is of interest; and
   when the metric message is a metric message of interest, storing the metric message in local storage;
   according to a schedule, included in the configuration, of when metric messages are to be forwarded to a network and system management system:
      retrieving metric messages stored in the local storage including the metric message;
      aggregating the retrieved metric messages to form a metric message payload;
      forwarding the metric message payload to the network and system management system on a second network; and
      after successfully forwarding the metric message payload to the network and system management system, deleting from the local storage each metric message aggregated into the metric message payload.

2. The method of claim 1, wherein the metric message is a message including data identifying the network entity that sent the metric message and data representative of a monitored state of the network entity.

3. The method of claim 2, wherein the metric message is a Simple Network Management Protocol (SNMP) message.

4. The method of claim 1, wherein the configuration data identifying metric messages of interest identifies at least one type of metric message of interest that is to be forwarded to the network and system management system.

5. The method of claim 1, wherein aggregating the retrieved metric messages to form the metric message payload includes encoding the metric message payload according to Simple Object Access Protocol (SOAP).

6. A system comprising:
   at least one processor, at least one memory device, at least one network interface device; and
   a listener agent module stored on the at least one memory device and executable by the at least one processor to:
      receive, via the at least one network interface device, a metric message broadcast on a first network by a network entity;
      based at least on a metric identified within data of the metric message and listener agent configuration data including data identifying metric messages of interest, determining whether the metric message is of interest; and
      when the metric message is a metric message of interest, hold the metric message and other received metric message in the at least one memory device according a scheduled period of when metric messages are to be forwarded to a network and system management system; and at the scheduled period:

retrieve metric messages stored in the local storage including the metric message;

aggregates the retrieved metric messages into a Simple Object Access Protocol (SOAP) message;

forwards the SOAP message to the network and system management system on a second network; and after successfully forwarding the SOAP message to the network and system management system, deleting each metric message from the at least one memory device aggregated into the SOAP message.

7. The system of claim 6, wherein the metric message is a message including data identifying the network entity that sent the metric message and data representative of a monitored state of the network entity.

8. The system of claim 7, wherein the metric message is a Simple Network Management Protocol (SNMP) message generated by a device on the first network monitored via the network and system management system.

9. The system of claim 6, wherein the listener agent configuration data identifying metric messages of interest identifies at least one type of metric message of interest that is to be forwarded to the network and system management system.

10. A non-transitory computer-readable medium, with instructions stored thereon that are executable by at least one processor of at least one computing device cause the at least one computing device to:

receive, on a first network, a metric message from a network entity;

based at least on a metric identified within data of the metric message and a configuration including data identifying metric messages of interest, determine the metric message is of interest; and when the metric message is a metric message of interest, store the metric message in local storage; and according to a schedule, included in the configuration, of when metric messages are to be forwarded to a network and system management system:

retrieve metric messages stored in the local storage including the metric message;

aggregate the retrieved metric messages to form a metric message payload;

forward the metric message payload to the network and system management system; and after successfully forwarding the metric message payload to the network and system management system, delete each metric message from the local storage aggregated into the metric message payload.

11. The non-transitory computer-readable medium of claim 10, wherein the metric message is a message including data identifying the network entity that sent the metric message and data representative of a monitored state of the network entity.

12. The non-transitory computer-readable medium of claim 11, wherein the metric message is a Simple Network Management Protocol (SNMP) message.

13. The non-transitory computer-readable medium of claim 10, wherein messages are determined not to be interest are ignored.

14. The non-transitory computer-readable medium of claim 10, wherein aggregating the retrieved metric messages to form the metric message payload includes encoding the metric message payload according to Simple Object Access Protocol (SOAP).

* * * * *